United States Patent [19]
Novak

[11] 3,877,905
[45] Apr. 15, 1975

[54] FILTRATION SYSTEM
[75] Inventor: Richard A. Novak, Boston, Mass.
[73] Assignee: Advanced Product Engineering Corporation, Boston, Mass.
[22] Filed: Jan. 5, 1973
[21] Appl. No.: 321,312

[52] U.S. Cl. ................................. 55/404
[51] Int. Cl. .................... B01d 45/00; B04b 5/12
[58] Field of Search ....... 210/360, 360 A, 416, 380; 55/400, 404, 242

[56] References Cited
UNITED STATES PATENTS
| | | | |
|---|---|---|---|
| 3,318,075 | 5/1967 | Wilson | 55/242 X |
| 3,378,143 | 4/1968 | Tipping | 210/416 |
| 3,443,696 | 5/1969 | Schutte | 210/297 |
| 3,447,290 | 6/1969 | Flory | 55/404 |
| 3,627,130 | 12/1971 | Talley, Jr. | 210/380 X |
| 3,655,058 | 4/1972 | Novack | 210/360 A |

FOREIGN PATENTS OR APPLICATIONS
1,221,616  6/1960  France ........................... 210/360 A

*Primary Examiner*—Roy Lake
*Assistant Examiner*—J. W. Davie
*Attorney, Agent, or Firm*—Dike, Bronstein, Roberts, Cushman & Pfund

[57] ABSTRACT

A filtration device including a self-propelling rotating filter cage and means to aid in the rotation of the filter cage, said means comprising motor drive means or pressure producing means.

6 Claims, 7 Drawing Figures

FILTRATION SYSTEM

BACKGROUND OF THE DISCLOSURE

The inventions described below relate to improvements upon the devices disclosed in U.S. Patent Ser. No. 054,507, filed July 13, 1970 and issued on Apr. 11, 1972 as U.S. Pat. No. 3,655,058, and to U.S. Patent applications Ser. Nos. 242,103 and 241,747, filed, respectively, on Apr. 7, 1972 and Apr. 6, 1972. The latter two applications deal with improvements of the device of U.S. Pat. No. 3,655,058, and all three applications are incorporated herein in their entirety by reference thereto.

The aforementioned applications disclose in general an improved filtration apparatus in which the filtration medium is contained in a filter cage rotating at high speed. The filter cage is preferably cylindrical in shape, and it rotates about its axis. The polluted gas, or air, passes through the filter medium from the outside radially inward. The pollutant, a solid or liquid aerosol, is stopped by the filtration medium, agglomerates into particles large enough to become subject to the centrifugal force field generated by the rotation of the filter cage, and is thrown outwardly from the filter medium. In particular, these applications when considered together disclose a novel compressor which forces the gas through the system and supplies the pressure head to overcome the pressure drops in the system and through the filter medium, a novel turbine or expander element whose purpose is to recover as much as possible of the high swirl energy which exists at the point at which the cleansed fluid leaves the filter material, and a novel diffusing discharge passage whose purpose is to convert the remaining kinetic energy of the fluid into pressure energy. There is also described novel means to prevent leakage of gas from the rotating element of the system, but to allow the liquid pollutant to be discharged as well as novel means to prevent polluted gases from getting from the inlet of the system to its discharge without passing through the filter medium. In addition, at least one of the aforementioned applications describe novel scrubbing and backwashing techniques to be used when solid particles are to be dealt with.

More particularly, this invention is an improvement over the embodiments shown in FIGS. 7-9 and 13 in U.S. Patent applications Ser. Nos. 241,747 and 242,103. The embodiments shown in FIGS. 7-9 and 13 illustrates a device which may be partly or wholly self-propelling.

SUMMARY OF THE DISCLOSURE

The present disclosure describes a filtration device including a self-propelling rotating filter cage preferably cylindrical in shape, an inlet for the flow of polluted gas into the device and an outlet for the flow of cleansed gas out of the device and any one or combination of the following: (1) First means such as a fan or blower to provide high pressure upstream to propel the filter cage; (2) Motor means provided to drive the filter cage; (3) Second means such as a fan or blower to provide a suction head and flow sufficient to pull the polluted gas through the device for cleansing and to self-propel the filter cage at the desired speed.

DETAILED DESCRIPTION OF THE DISCLOSURE

FIGS. 1-4 are reproductions without change of FIGS. 7-9 and 13 of aforementioned U.S. Patent Applications Ser. Nos. 241,747 and 242,104 except that certain numbers have been changed.

Figure 4:
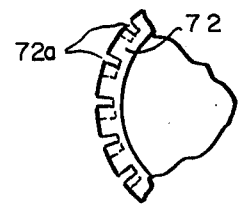
Figure 3:
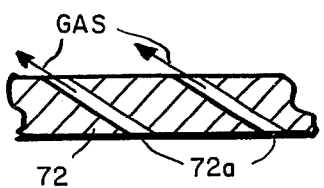

As described in U.S. Patent applications Ser. Nos. 241,747 and 242,103 the device shown in FIGS. 1-4 presupposes that the pollutant-laden air or gas entering at 71 is at a high pressure. From the inlet it enters the stationary annular chamber 71a and from thence into the nozzles 72. A cross-section of the nozzles 72 is shown in FIG. 4 and a top view in FIG. 3. In passing through the open nozzle passages 72a the gas (e.g. air) is turned sharply and has imparted to it a high component of tangential velocity. The nozzles 72 shown convert the pressure energy existing upstream of the nozzle (within stationary chamber 71a) into kinetic energy at the nozzle exit.

The particle-laden fluid passes into the rotating volume bounded on the outside of the rotating shell 28. It passes down through the filter 24 and the particles, solid or liquid, are removed. The now-cleaned gas then passes into the passages between the vanes 25. In addition, supporting vanes 23a are preferably provided for supporting the shell 28 and to aid in propulsion of the rotating elements.

Figure 1:
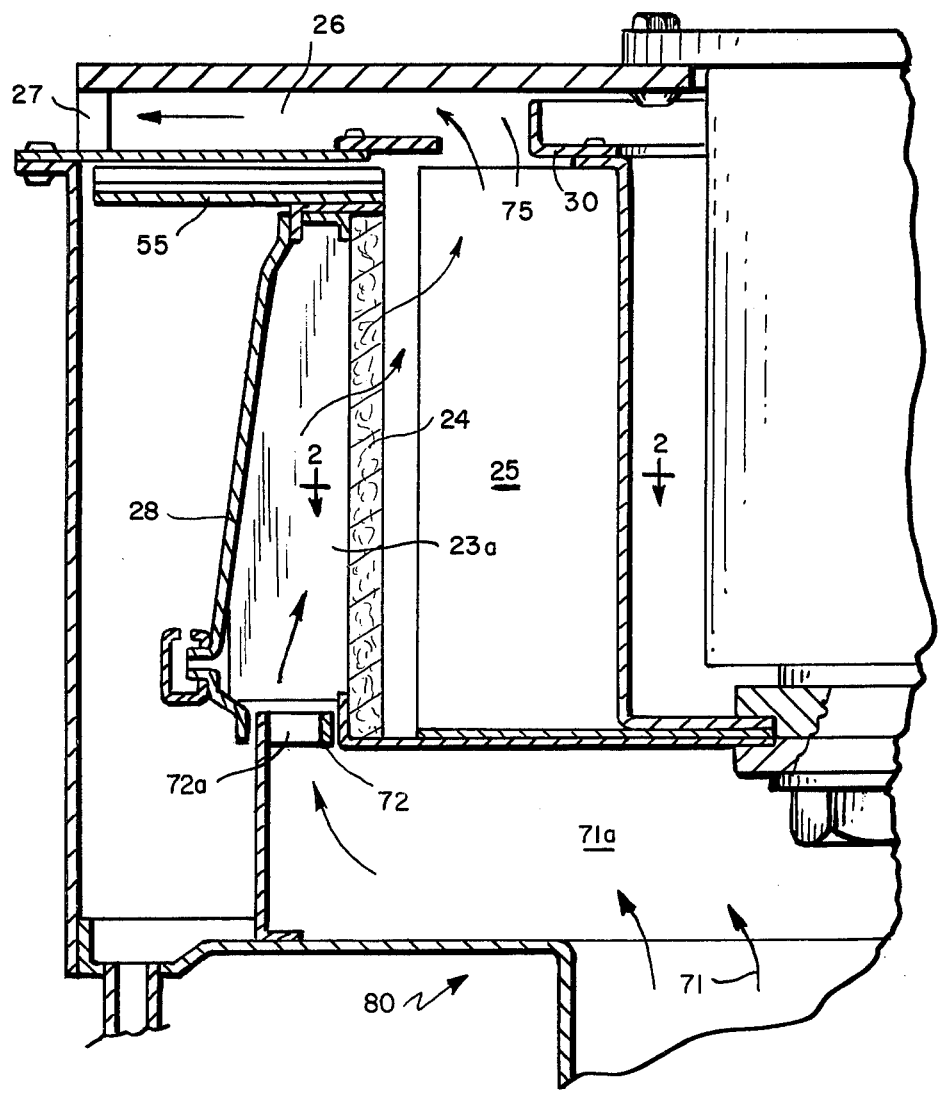
FIG. 1 is a reproduction of the filtration system shown as FIG. 7 in the aforementioned Patent Applications Ser. Nos. 242,103 and 241,747 with certain numbers changed.
Figure 2:
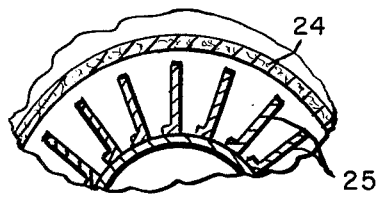
FIGS. 2-4 are reproductions of FIGS. 8, 9 and 13 of the aforementioned patent applications with certain numbers changed.

This is shown somewhat more clearly in FIG. 2. The vanes 25 are turbine vanes, and act the same as the radial vanes of a radial flow turbine. The cleaned air or gas exits from the rotating portion of the system and flows radially outward through the stationary passage 26. This passage is a radial diffusor which not only conducts the cleaned air out of the system, but also serves to convert any kinetic energy which remains at port 75 back into pressure energy. The gas leaves the system at the final exit port 27.

The pollutant which was originally contained in the gas is stopped at the face of the rotating filter 24. If it is a liquid pollutant it will agglomerate into particles large enough so that they become subject to the centrifugal force field generated by the rotation of the filter device. The liquid is thrown to the outermost radius of the conical shell 28 and thence out of the rotating system altogether. Details of its means of escape, and its collection, are described in the aforementioned patent and patent applications, and are incorporated herein in their entirety.

If the gas being filtered contains solid rather than liquid particulate, one form or another of the washing or scrubbing procedures described in the aforementioned patent and patent applications may be used, and the previous explanations apply in their entirety.

It is intended that details relating to the sealing mechanism described in the cited patent applications shall apply in their entirety.

Although the device described above or described in greater detail in U.S. Patent applications Ser. Nos. 241,747 and 242,103 is perfectly adequate for its intended purposes, the embodiments disclosed herein have been provided thereto in order that they may be incorporated into and then provide a filtration system of greater versatility and flexibility.

Figure 5:
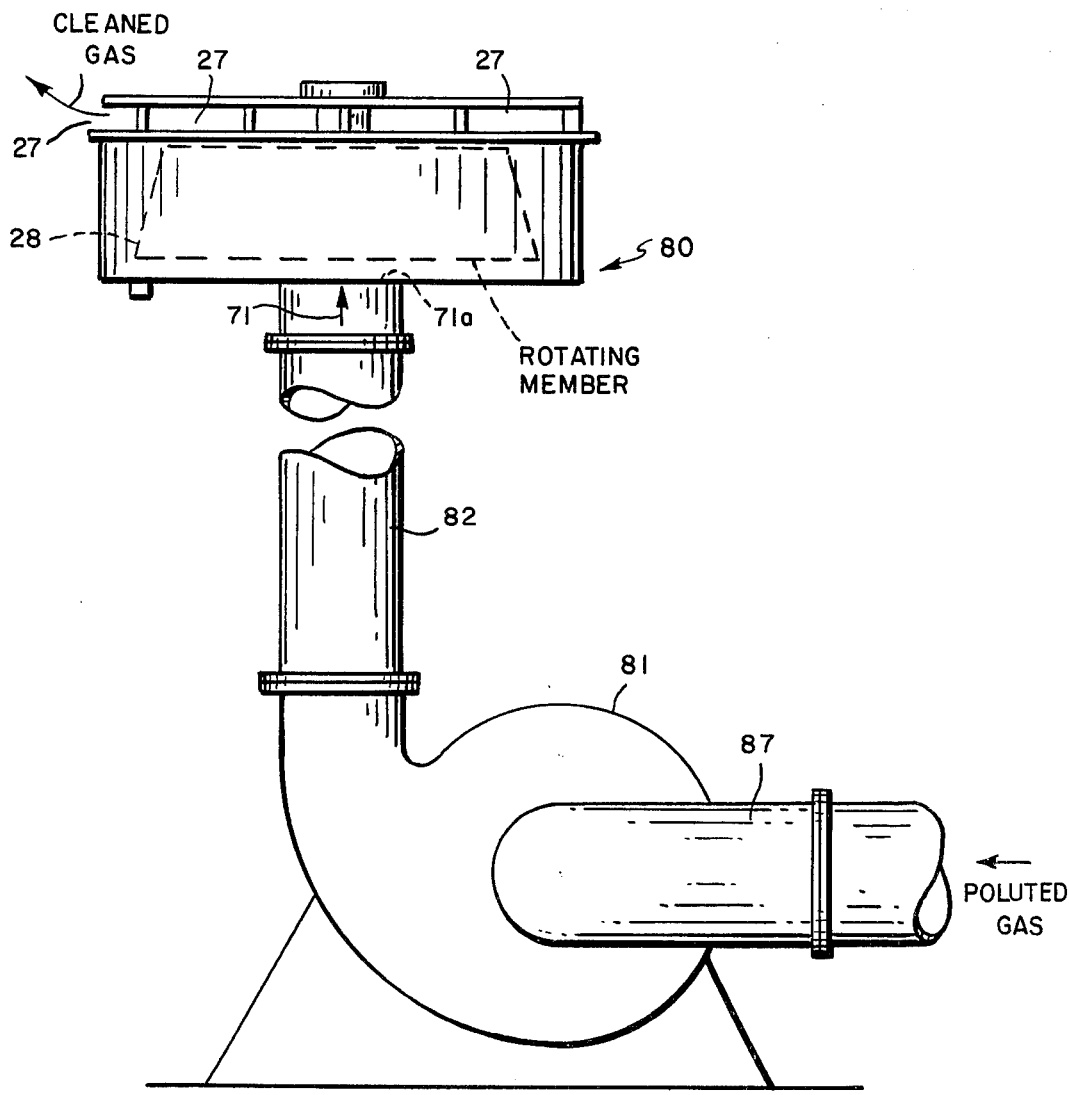
FIG. 5 diagrammatically illustrates the first means such as a blower upstream of the filtration system inlet.

Reference should now be had to FIG. 5, which shows the filtration device 80. This is meant to represent some version of the same basic device whose possible internal details have been described in connecting with FIGS. 1, 2, 3 and 4. The polluted fluid enters the device at 71; cleaned fluid exits at 27. For the first system configuration shown on FIG. 5, an upstream pressure head is supplied by the blower 81, which feeds the device, connected to it by the duct 82. The blower, itself, sucks the polluted fluid through its inlet duct system 87 from the pollution source. The blower, or fan, 81 is pictured on FIG. 5 as being a centrifugal blower. it could as well be an axial fan.

In the system configuration shown in FIG. 5, the blower would preferably be matched to the filtration device 80 so that, not only would it force the required quantity of polluted fluid through it, but also it would supply a positive head upstream of the filtration unit sufficient to rotate the rotating members 23a, 24, 25, 28, 30, 55, etc., as a turbine at a speed high enough so that the generated centrifugal force filed on its rotating filter cage makes it effectively self-cleaning.

Figure 6:
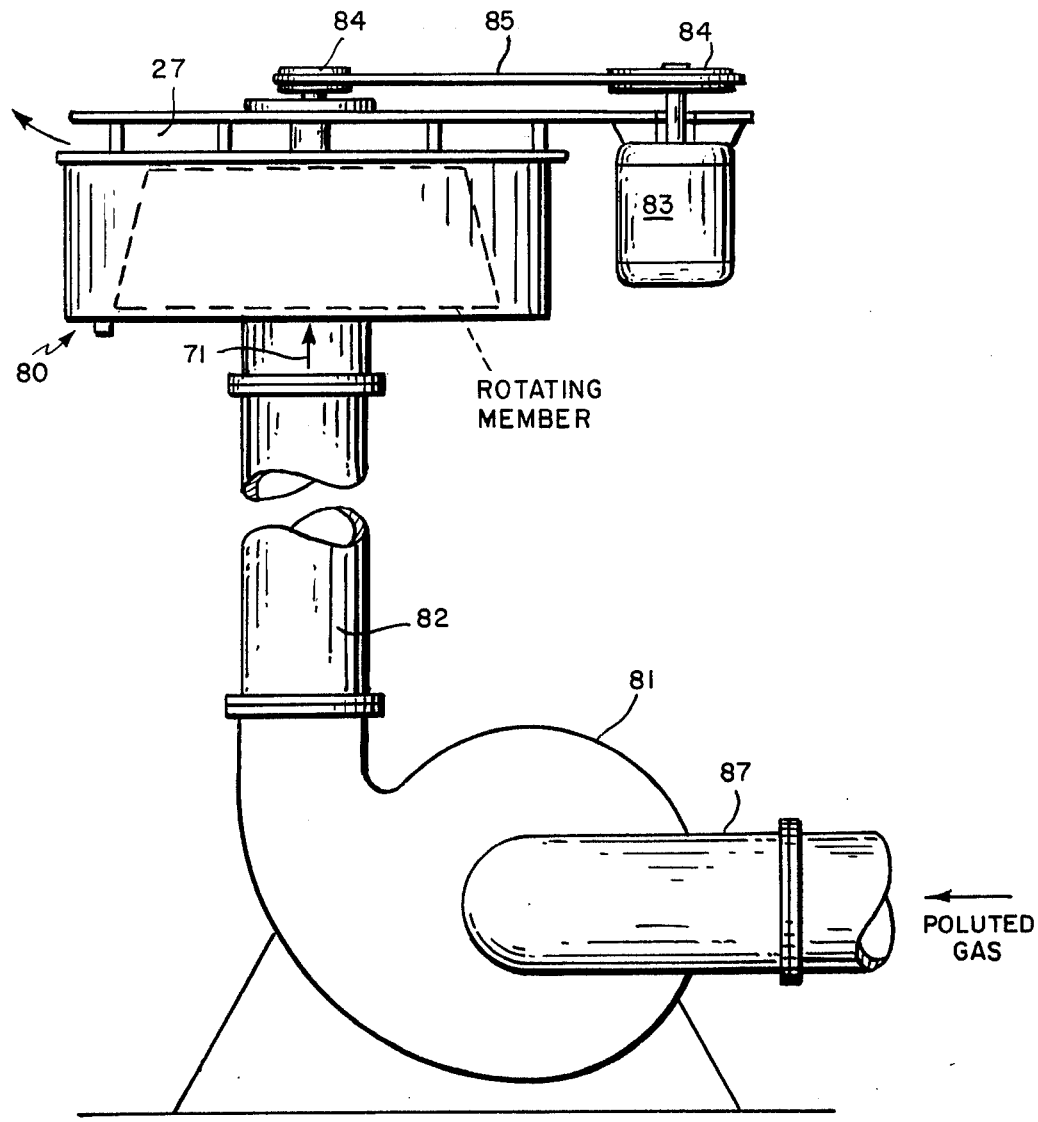
FIG. 6 diagrammatically illustrates a motor drive for the rotating filter member.

Reference should now be had to FIG. 6. The system configuration shown is very similar to that of FIG. 5, except that the filtration unit is equipped with its own motor drive 83. The particular system shown is an electric motor with a drive through a belt 85 and pulleys 84. It could as well be a geared drive or a direct drive. Applications may occur where variable speed is expedient for varying operating requirements.

Figure 7:
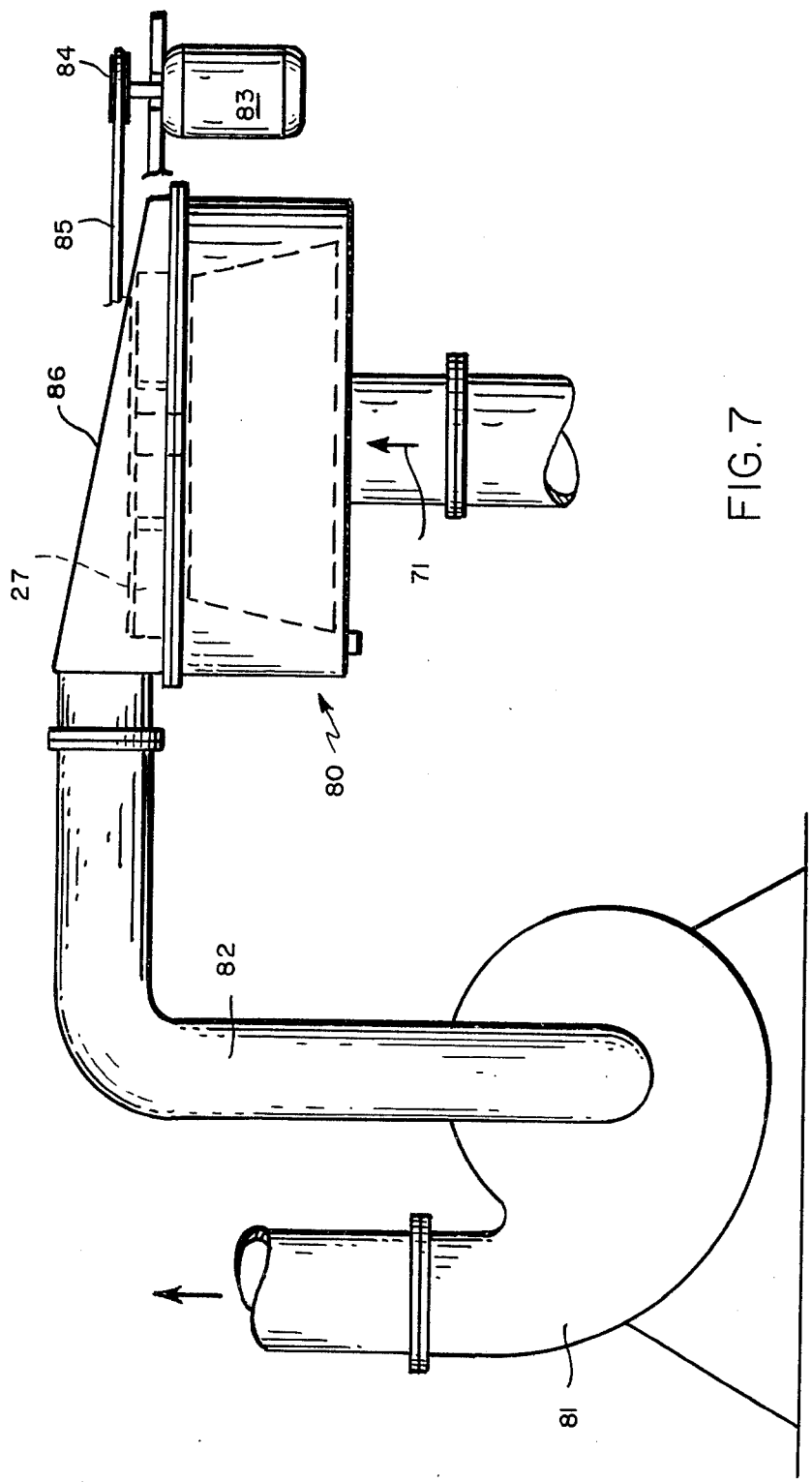
FIG. 7 diagrammatically illustrates a blower positioned downstream of the filter system outlet.

Reference now should be had to FIG. 7. The system configuration shown is one for which the external fan or blower 81 is placed downstream of the filtration unit 80. In order for such a system configuration to operate effectively, the filtration unit must be equipped with a collector cover 86 surrounding discharges 27. Once again, two variants of this system configuration are possible, i.e., self-propelling when the filtration unit characteristics and the suction blower characteristics are properly matched; motor 83 drives when they are not.

I claim:

1. A filtration system for removing particulate matter from a fluid medium, said system comprising a housing, a filter means positioned in the housing for rotation therewith, said housing having fluid inlet and fluid discharge means, a conical shell means positioned between said housing and said filter means defining a space for the reception of the fluid medium received at said inlet and containing particulate matter, said conical shell means supported by said filter means for rotation therewith, stationary annular nozzle means for imparting a tangential velocity component to the fluid medium containing the particulate matter entering the inlet means, vanes supported by the conical shell and the filter means and rotatable therewith and against which the fluid impinges, and a blower upstream of the housing inlet and coupled thereto which supplies the fluid medium and the particulate matter to the inlet matched in head and flow capacity so that the fluid impinging upon said vanes will impart rotary motion to said filter means, thereby causing said filter means to rotate at a speed which is sufficient for self-cleaning action.

2. A system according to claim 1 in which the filter cage is driven with a motor, so that the filter means speed can be fixed independent of fluid flow conditions.

3. A system according to claim 2 in which the filtration apparatus is combined with a suction means downstream of the filter means.

4. A system according to claim 1 in which the filtration apparatus is combined with a suction blower downstream of the filter cage.

5. A filtration system for removing particulate matter from a fluid medium, said system comprising a housing, a filter means positioned in the housing for rotation therewith, said housing having fluid inlet and fluid discharge means, a conical shell means positioned between said housing and said filter means defining a space for the reception of the fluid medium received at said inlet and containing particulate matter, said conical shell means supported by said filter means for rotation therewith, stationary annular nozzle means for imparting a tangential velocity component to the fluid medium containing the particulate matter entering the inlet means, vanes supported by the conical shell and the filter means and rotatable therewith and against which the fluid impinges, suction blower means downstream of the housing discharge means and coupled thereto which supplies the fluid medium and the particulate matter to the inlet matched in head and flow capacity so that the fluid impinging upon said vanes will impart rotary motion to said filter means, thereby causing said filter means to rotate at a speed which is sufficient for self-cleaning action, said discharge means comprising a collector cover positioned downstream of the filter means.

6. In a system according to claim 5 which includes a motor coupled to drive the filter cage.

* * * * *